(12) United States Patent
Sakamachi

(10) Patent No.: US 11,858,135 B2
(45) Date of Patent: Jan. 2, 2024

(54) ROBOT, METHOD OF ASSEMBLING ROBOT, AND ROBOT SYSTEM

(71) Applicant: SEIKO EPSON CORPORATION, Tokyo (JP)

(72) Inventor: Junki Sakamachi, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/993,057

(22) Filed: Nov. 23, 2022

(65) Prior Publication Data

US 2023/0166394 A1 Jun. 1, 2023

(30) Foreign Application Priority Data

Nov. 26, 2021 (JP) ................. 2021-192566

(51) Int. Cl.
*B25J 11/00* (2006.01)
*B25J 9/10* (2006.01)
*B25J 9/04* (2006.01)
*B25J 9/00* (2006.01)
*B25J 17/00* (2006.01)

(52) U.S. Cl.
CPC ............. *B25J 9/104* (2013.01); *B25J 9/0009* (2013.01); *B25J 9/042* (2013.01); *B25J 9/102* (2013.01); *B25J 17/00* (2013.01)

(58) Field of Classification Search
CPC ........ F16H 57/025; B25J 9/0009; B25J 9/104
See application file for complete search history.

(56) References Cited

U.S. PATENT DOCUMENTS 4,787,813 A * 11/1988 Stevens .................... B25J 9/104
414/744.5
2019/0315001 A1 10/2019 Kume

FOREIGN PATENT DOCUMENTS

JP H05-123986 A 5/1993
JP 2000-117667 A 4/2000
JP 2019-181627 A 10/2019

* cited by examiner

*Primary Examiner* — Randell J Krug
(74) *Attorney, Agent, or Firm* — Harness, Dickey & Pierce, P.L.C.

(57) ABSTRACT

A robot includes a first member and a second member, the first member includes a housing having a first wall and a second wall disposed to face each other, a first protrusion, and a second protrusion, a drive section having a motor body, a drive pulley and a flange, a joint section having a driven pulley and a belt, the first protrusion and the second protrusion having support sections that support both end portions of the flange, a separation distance between the support sections being shorter than a length of the flange in which the flange protrudes, and missing sections configured such that a separation distance between the missing sections is longer than the length of the flange in the direction in which the flange protrudes, both end portions of the flange passing through the missing sections.

9 Claims, 12 Drawing Sheets ical Field

The present disclosure relates to a robot, a method of assembling a robot, and a robot system.

2. Related Art

JP-A-5-123986 discloses a horizontal SCARA robot including a frame having a housing, a first arm rotatably supported by the frame, and a second arm rotatably attached to the first arm. The first arm is rotatably provided on a first shaft passing through the frame, and the second arm is rotatably provided on a second shaft passing through the first arm.

A first servo motor is connected to a lower end of the first shaft via a timing belt winding mechanism. A second servo motor is connected to a lower end of the second shaft via a timing belt winding mechanism. Among them, the first servo motor is accommodated in and fixed to the housing of the frame.

As a method of fixing the servo motor to the housing, there is a method in which a flange attached to the servo motor is placed on (engaged with) a protruding portion protruding from an inner wall of the housing. Since the flange is wider than the main body of the servo motor, the position in the vertical direction can be determined with high accuracy by placing the flange on the protrusion.

When the robot described in JP-A-5-123986 is assembled, the first servo motor is fixed to the housing, and then the timing belt connected to the first servo motor is wound around a pulley. However, in order to wind the timing belt around the pulley connected to the first servo motor, the timing belt needs to be bent strongly. Therefore, a strong load is applied to the timing belt, and the timing belt may be damaged.

Therefore, it is a problem to wind the timing belt around a pulley connected to the servo motor while suppressing a load applied to the timing belt.

SUMMARY

A robot according to an application example of the present disclosure includes a first member and a second member that rotates relative to the first member, wherein the first member includes a housing including a first wall and a second wall disposed to face each other separated by a distance, a first protrusion protruding from the first wall toward the second wall, and a second protrusion protruding from the second wall toward the first wall, a drive section including a motor body that generates a drive force rotating about a drive axis, a drive pulley that is connected to the motor body, and a flange that protrudes from the motor body in a direction intersecting the drive axis, a joint section that has a driven pulley and that transmits the driving force to the second member, and a belt wound around the drive pulley and the driven pulley, and the first protrusion and the second protrusion include support sections that support both end portions of the flange in the direction in which the flange protrudes, a separation distance between the support sections being shorter than a length of the flange in the direction in which the flange protrudes and missing sections configured such that a separation distance between the missing sections is longer than the length of the flange in the direction in which the flange protrudes, both end portions of the flange passing through the missing sections.

A method of assembling a robot according to an application example of the present disclosure, the robot including a first member and a second member that rotates relative to the first member, the method comprising a step of preparing the first member before assembly, the first member before assembly including a housing including a first wall and a second wall disposed to face each other separated by a distance, a first protrusion protruding from the first wall toward the second wall, and a second protrusion protruding from the second wall toward the first wall, a drive section including a motor body that generates a drive force rotating about a drive axis, a drive pulley that is connected to the motor body, and a flange that protrudes from the motor body in a direction intersecting the drive axis, a joint section that has a driven pulley and that transmits the driving force to the second member, and a belt, the first protrusion and the second protrusion include support sections in which a separation distance between the support sections is shorter than a length of the flange to which the flange protrudes and missing sections in which a separation distance between the missing sections is longer than the length of the flange in which the flange protrudes, a step of winding the belt around the driven pulley, a step of bringing the drive section close to the belt through a path in which both ends of the flange in a direction in which the flange protrudes pass through the missing sections, a step of winding the belt around the drive pulley and a step of fixing the flange to the support section.

A robot system according to an application example of the present disclosure comprising the robot according to the application example of the present disclosure and a controller that controls an operation of the robot.

DESCRIPTION OF EMBODIMENT

Hereinafter, preferred embodiments of a robot, a method of assembling a robot, and a robot system of the present disclosure will be described in detail with reference to the accompanying drawings.

1. Robot System

First, a robot system according to an embodiment will be described.

Figure 1:
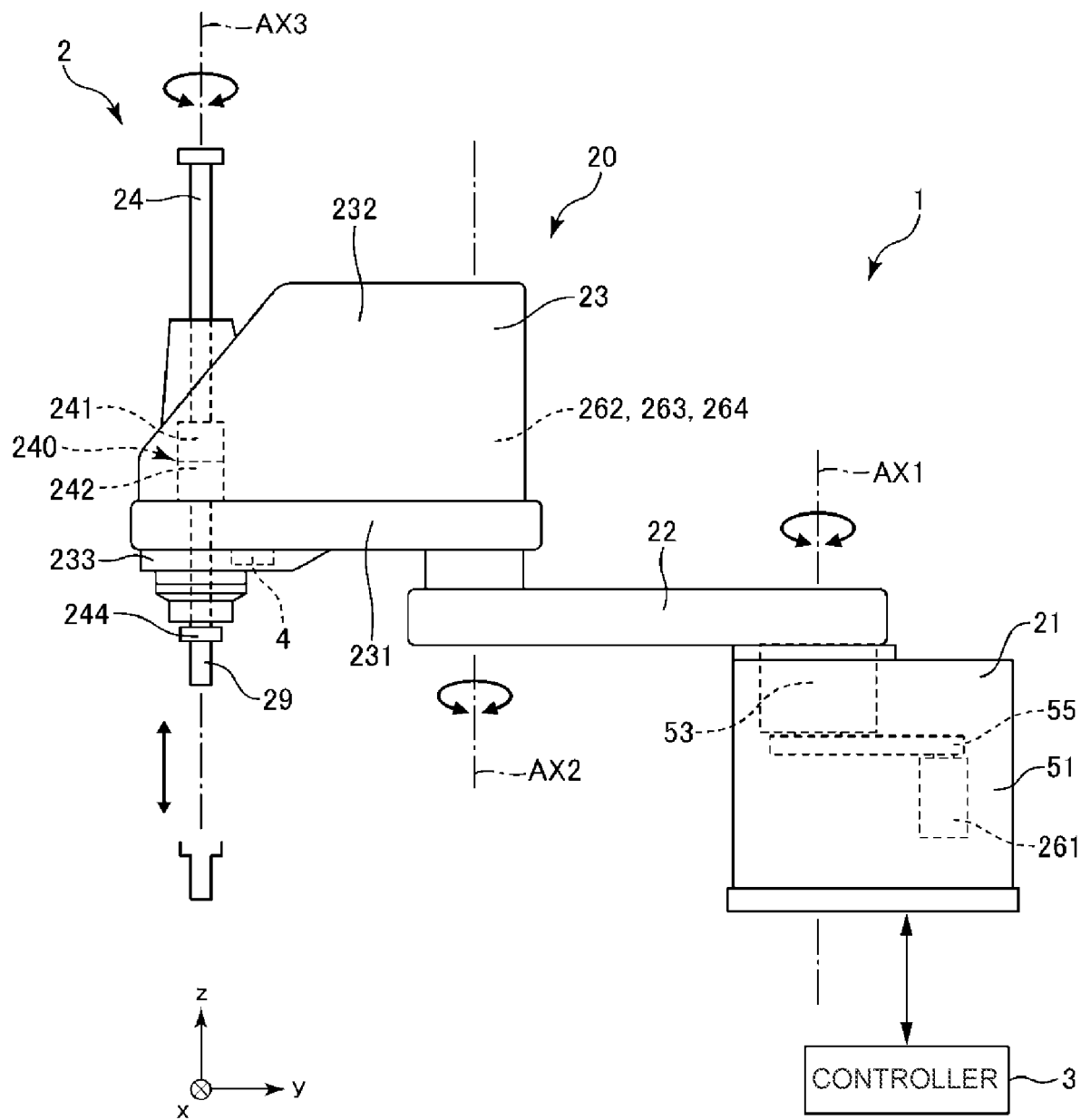
FIG. 1 is a side view showing a robot system according to an embodiment.
Figure 2:
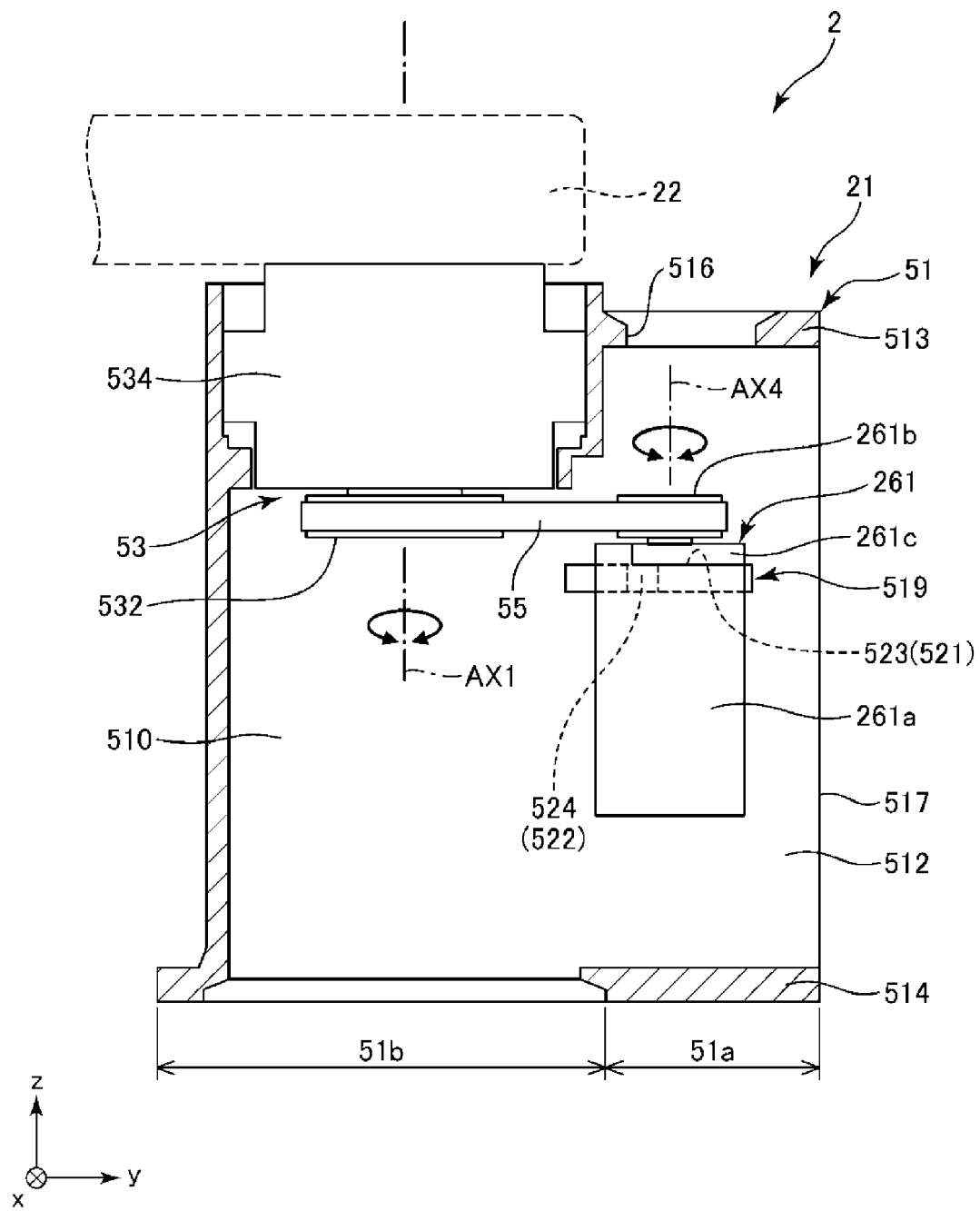
FIG. 2 is a partial sectional view of the base shown in FIG. 1.

FIG. 1 is a side view showing a robot system 1 according to the embodiment. FIG. 2 is a partial sectional view of a base 21 shown in FIG. 1. In the drawings of the present disclosure, for convenience of explanation, an x axis, a y axis, and a z axis are set as three axes orthogonal to each other, and each of them is indicated by an arrow. In the following description, a direction parallel to the x axis is referred to as an "x axis direction", a direction parallel to the y axis is referred to as a "y axis direction", and a direction parallel to the z axis is referred to as a "z axis direction". In addition, in the following description, a tip side of each illustrated arrow is referred to as "+(plus)", and a base end side thereof is referred to as "−(minus)". Further, in the following description, for convenience of description, the +z axis direction is referred to as "upper" and the −z axis direction is referred to as "lower". In addition, in the present disclosure, "connection" refers to both a state in which two members are in direct contact with each other and a state in which the two members are in indirect contact with each other via an arbitrary member. Further, in the present disclosure, the term "parallel" means a state in which lines, planes, or lines and planes are in a state parallel to each other or in a state inclined in a range of ±5 degrees or less from the parallel state.

A robot system 1 shown in FIG. 1 includes a robot 2 and a controller 3 for controlling the operation of the robot 2. Applications of the robot system 1 are not particularly limited, and examples thereof include operations such as holding, transporting, assembling, and inspecting a workpiece.

2. Robot

In the present embodiment, the robot 2 is a horizontal articulated robot (SCARA robot). The robot 2 includes a base 21 (first member) and a robot arm 20. In the present embodiment, the robot arm 20 includes a first arm 22 (second member), a second arm 23, a shaft 24, a payload 244, and an end effector 29, which will be described later.

2.1. Outline of Base

The base 21 is fixed to an installation surface (not shown) with bolts or the like. Examples of the installation surface include a floor surface, a wall surface, a ceiling surface, and an upper surface of a table, a frame, or the like.

As shown in FIG. 2, the base 21 includes a housing 51, a drive section 261, a joint section 53, and a belt 55.

The housing 51 shown in FIG. 2 has an approximately rectangular parallelepiped shape having an internal space 510. The outer shape of the base 21 is not limited to the shape shown in FIG. 2, and may be any shape. As shown in FIG. 2, the drive section 261, the joint section 53, the belt 55, and the like are accommodated in the internal space 510 of the housing 51.

Examples of the constituent material of the housing 51 include a metal material and a resin material, and a metal material is desirably used. Accordingly, the rigidity of the housing 51 can be increased, and unintended vibration of the base 21 can be suppressed.

The drive section 261 generates a driving force to rotate the first arm 22 about the first axis AX1 with respect to the base 21. Further, the drive section 261 has an encoder (not shown) for detecting a rotation amount thereof. A rotation angle of the first arm 22 with respect to the base 21 can be detected by an output from the encoder.

The joint section 53 transmits a driving force to the first arm 22. Specifically, the driving force from the drive section 261 is converted into an operation of rotating the first arm 22. The belt 55 is an endless belt that transmits the driving force from the drive section 261 to the joint section 53.

2.2. Outline of Robot Arm

The robot arm 20 is connected to the base 21, and the posture of the robot arm 20 is controlled by the controller 3. Accordingly, the end effector 29 is held at a target position and posture, and various operations are realized. In the robot arm 20 shown in FIG. 1, the first arm 22, the second arm 23, the shaft 24, the payload 244, and the end effector 29 are connected to each other in this order. In the following description, for convenience of description, the end effector 29 side of the robot 2 is referred to as a "tip end", and the base 21 side thereof is referred to as a "base end".

The first arm 22 is rotatable with respect to the base 21 about a first axis AX1 parallel to the z axis. The second arm 23 is provided at a tip end portion of the first arm 22 and is rotatable about a second axis AX2 parallel to the first axis AX1. The shaft 24 is provided at a tip end portion of the second arm 23, and is rotatable about a third axis AX3 parallel to the second axis AX2 and translatable along the third axis AX3.

The second arm 23 includes a base 231, an upper cover 232, a lower cover 233, drive sections 262, 263, 264, a joint section 240, and an inertial sensor 4.

The base 231 is a core of the second arm 23, and supports the drive sections 262, 263, 264 and the like. The upper cover 232 is provided above the base 231 and covers the drive sections 262, 263, 264 and the like. The lower cover 233 is provided below the base 231 and covers the inertial sensor 4 and the like placed on the lower surface of the base 231. Examples of the inertial sensor 4 include an angular velocity sensor and an acceleration sensor. Note that the inertial sensor 4 may be omitted.

The drive section 262 is located at a base end portion of the base 231 and generates a driving force to rotate the second arm 23 about the second axis AX2 with respect to the first arm 22. The drive section 262 includes a motor, a reduction gear, an encoder, and the like, which are not illustrated. The rotation angle of the second arm 23 with respect to the first arm 22 can be detected by the output from the encoder.

The drive section 263 is located between the base end portion and the tip end portion of the base 231, and generates a driving force to rotate a ball screw nut 241 and translates the shaft 24 in a direction along the third axis AX3. The drive section 263 includes a motor, a reduction gear, an encoder, and the like, which are not illustrated. An amount of translational movement of the shaft 24 with respect to the second arm 23 can be detected by the output from the encoder.

The drive section 264 is located between the tip end portion and the base end portion of the base 231, and generates a driving force to rotate the shaft 24 about the third axis AX3 by rotating a spline nut 242. The drive section 264 includes a motor, a reduction gear, an encoder, and the like, which are not illustrated. The rotation amount of the shaft 24 with respect to the second arm 23 can be detected by an output from the encoder.

The joint section 240 transmits a driving force to the shaft 24. Specifically, the driving forces from the drive sections 263 and 264 are converted into an operation of translation and rotation of the shaft 24.

The shaft 24 is a cylindrical shaped shaft. The shaft 24 is, with respect to the second arm 23, translatable along a third axis AX3 along the vertical direction and rotatable around the third axis AX3.

Further, the ball screw nut 241 and the spline nut 242 are installed in the middle of the shaft 24 in the longitudinal direction, and the shaft 24 is supported by these.

A payload 244 for mounting the end effector 29 is provided at a tip end portion of the shaft 24. The end effector 29 attached to the payload 244 is not particularly limited, and examples thereof include a hand that holds an object, a tool that processes an object, and an inspection device that inspects an object. A configuration in which the end effector 29 is omitted may be used as the robot arm 20.

2.3. Details of Base

Figure 3:
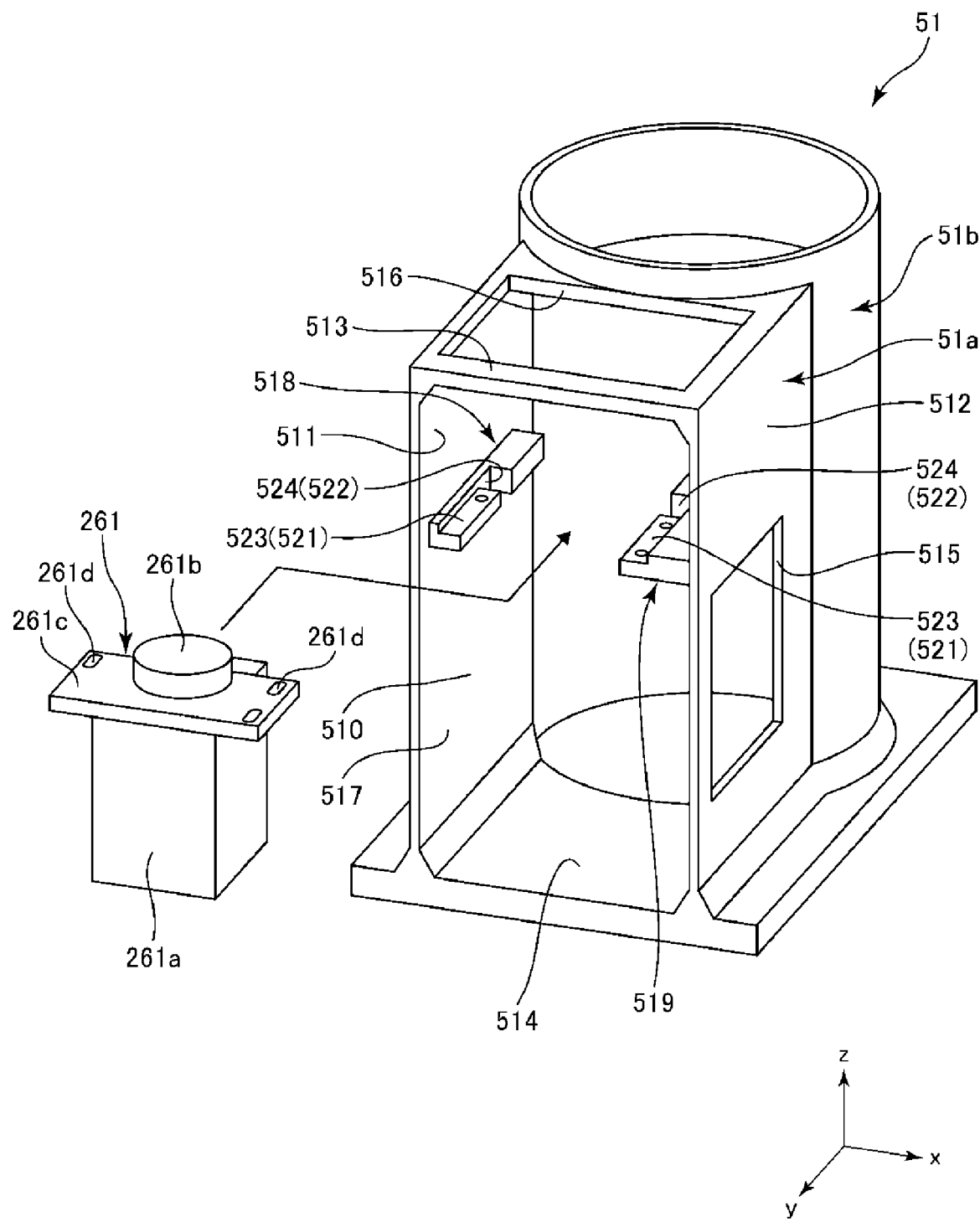
FIG. 3 is a perspective view showing only a housing and a drive section included in the base of FIG. 2.
Figure 4:
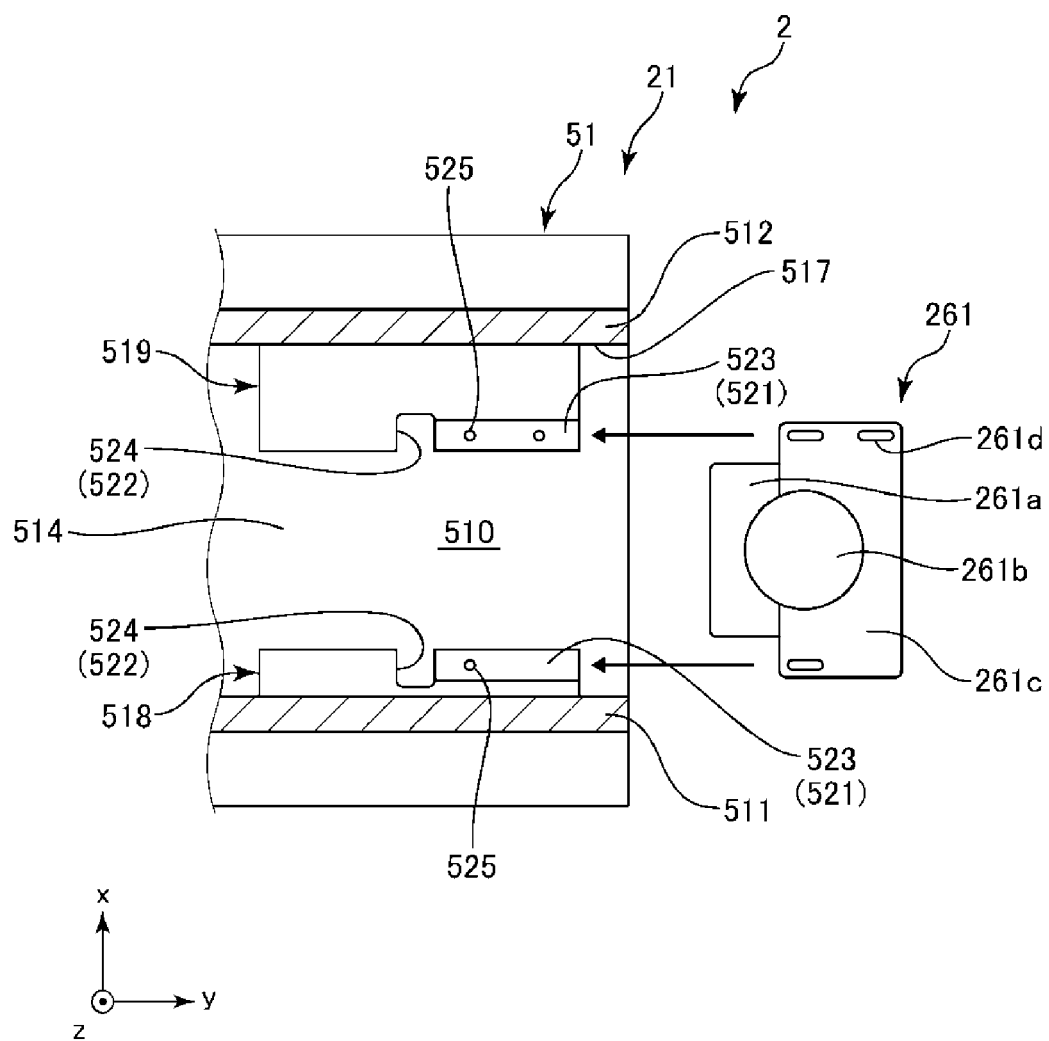
FIG. 4 is a sectional view of the housing and a top view of the drive section which are shown in FIG. 3.

FIG. 3 is a perspective view showing only the housing 51 and the drive section 261 included in the base 21 of FIG. 2. FIG. 4 is a sectional view of the housing 51 and a top view of the drive section 261 which are shown in FIG. 3. FIG. 3 and FIG. 4 are views showing the base 21 when the assembly is completed. Arrows shown in FIG. 3 and FIG. 4 indicate the position of the drive section 261 at the time of completion of assembly.

The housing 51 shown in FIG. 3 includes a drive section containing portion 51*a* in which the drive section 261 is contained and a joint section containing portion 51*b* in which the joint section 53 is contained. The internal space 510 is constituted by inside of the drive section containing portion 51*a* and inside of the joint section containing portion 51*b*. As will be described later, the internal space 510 is defined by a first wall 511, a second wall 512, a top plate 513, a bottom plate 514, and the joint section containing portion 51*b*, which constitute the housing 51.

The drive section containing portion 51*a* has a substantially rectangular parallelepiped shape and has a long axis extending parallel to the z axis. The drive section containing portion 51*a* has the first wall 511 and the second wall 512, which extend along the z-y plane. The first wall 511 and the second wall 512 are disposed to face each other separated by a distance from each other (with the internal space 510 in between). The drive section containing portion 51*a* has the top plate 513 and the bottom plate 514, which extend along the x-y plane. The top plate 513 is connected to an upper end of the first wall 511 and an upper end of the second wall 512. The bottom plate 514 is connected to a lower end of the first wall 511 and a lower end of the second wall 512.

The second wall 512 has a side window 515 connecting the internal space 510 and the external space. The top plate 513 has an upper window 516 (opening) connecting the internal space 510 and the external space. The side window 515 may be provided in the first wall 511 instead of the second wall 512, or may be provided in both the first wall 511 and the second wall 512. Further, each of the side window 515 and the upper window 516 is closed by a cover (not shown). The edge of the side window 515 and the edge of the upper window 516 have a step or a taper so that the cover can be fixed by screws or the like. Note that the lid may not be closed.

The drive section containing portion 51*a* is a portion of the housing 51 on the positive side of the y axis, and includes a full wall window 517 connecting the internal space 510 and the external space. The full wall window 517 extends over the entire long axis of the drive section containing portion 51*a*. The full wall window 517 can be used as an access route when a member is carried into the internal space 510. It should be noted that the full wall window 517 may extend not entirely but partially along the longitudinal axis of the drive section containing portion 51*a*. The full wall window 517 may be closed by a lid (not shown).

As shown in FIG. 3 and FIG. 4, the drive section containing portion 51*a* includes a first protrusion 518 and a second protrusion 519. The first protrusion 518 protrudes from the first wall 511 toward the internal space 510. The second protrusion 519 protrudes from the second wall 512 toward the internal space 510.

The first protrusion 518 and the second protrusion 519 as a pair support the drive section 261 accommodated in the internal space 510.

As shown in FIG. 3, the drive section 261 includes a motor body 261*a*, a drive pulley 261*b*, and a flange 261*c*. The motor body 261*a* generates a driving force to rotate about a drive axis AX4. In a state in which the drive section 261 is installed in the housing 51, the drive axis AX4 extends substantially parallel to the first axis AX1. The drive pulley 261*b* is connected to the motor body 261*a*. The flange 261*c* has a plate shape with the z axis direction as a thicknesswise direction, and protrudes from the motor body 261*a* in the x axis direction. By placing the flange 261*c* on the first protrusion 518 and the second protrusion 519, the drive section 261 can be positioned in the z axis direction with respect to the housing 51. The direction in which the flange 261*c* protrudes is not limited to the x axis direction as long as the direction intersects with the drive axis AX4. Fixing holes 261*d* passing through the flange 261*c* are provided on the flange 261*c*. Screws (not shown) can be inserted into the fixing holes 261*d*, and the flange 261*c* can be fastened to the first protrusion 518 and the second protrusion 519 using the screws.

As shown in FIG. 4, each of the first protrusion 518 and the second protrusion 519 has a support section 521 and a missing section 522.

The support sections 521 support the flange 261*c* by the flange 261*c* being placed thereon. The support section 521 has a contact surface 523 that contacts the flange 261*c*. The contact surface 523 is recessed in comparison with portions of the first protrusion 518 and the second protrusion 519 other than the contact surface 523. By bringing the flange 261*c* into contact with the contact surface 523, that is, by engaging the contact surface 523 with the flange 261*c*, the flange 261*c* is supported by the support section 521. It is to be noted that the flange 261*c* has a long rectangular shape in the projecting direction thereof, in the x axis direction in the present embodiment, and both ends thereof are in contact with the contact surfaces 523.

Further, the support section 521 has fastening holes 525 extending along the z axis. The fastening holes 525 are used to fasten the flange 261*c* using screws after the flange 261*c* is brought into contact with the contact surface 523.

As will be described in detail later, the missing sections 522 have a shape that allows both end portions of the flange 261*c* to pass through when the posture of the drive section 261 is changed in association with the assembly of the robot 2. Specifically, the missing sections 522 include grooves 524 that penetrate each of the first protrusion 518 and the second protrusion 519 in the z axis direction. By providing such grooves 524, when the base 21 is assembled as will be described later, both ends of the flange 261*c* can move by a path passing through the missing sections 522. Accordingly, the belt 55 can be wound around the drive pulley 261b while suppressing the load applied to the belt 55 shown in FIG. 2.

Note that the grooves 524 shown in FIG. 4 may be expanded to the −y axis side from the positions shown in FIG. 4. However, if the grooves 524 are expanded, the mechanical strength of the first protrusion 518 and the second protrusion 519 may decrease, and the mechanical strength of the housing 51 may also decrease. Therefore, the widths of the grooves 524, that is, the lengths of the grooves 524 in the y axis direction are a width that allows both end portions of the flange 261c to pass, and are desirably not wider than necessary.

The joint section containing portion 51b is a portion of the housing 51 on the −y axis side. The joint section containing portion 51b has a substantially cylindrical shape with an upper end and a lower end open, respectively, and has a long axis extending parallel to the z axis. As shown in FIG. 2, the first arm 22 is connected to the upper end of the joint section containing portion 51b. The joint section 53 shown in FIG. 2 is accommodated in the joint section containing portion 51b.

As shown in FIG. 2, the joint section 53 has a driven pulley 532 and a reduction gear 534. The driven pulley 532 is connected to the reduction gear 534. The reduction gear 534 is connected to the first arm 22 shown in FIG. 2. Examples of the reduction gear 534 include a planocentric scheme.

The belt 55 transmits the driving force from the drive section 261 accommodated in the drive section containing portion 51a to the joint section 53 accommodated in the joint section containing portion 51b. Therefore, as shown in FIG. 2, the belt 55 is wound over the drive pulley 261b and the driven pulley 532. In a state in which the drive section 261 and the joint section 53 are installed in the housing 51, the belt 55 is wound in an annular shape extending in the x-y plane.

The constituent material of the belt 55 is not particularly limited, and examples thereof include a composite material of a stiffener and an elastic material. The belt 55 composed of such a composite material has a mechanical strength capable of transmitting a high torque driving force.

Examples of the stiffener include glass fiber, polyester fiber, nylon fiber, aramid fiber, carbon fiber, cotton thread, and the like, and one kind or a mixed fibers of two or more kinds thereof is used. Among them, glass fiber or carbon fiber is desirably used as the stiffener.

Examples of the elastic material include at least one selected from the group consisting of nitrile rubber, carboxylated nitrile rubber, hydrogenated nitrile rubber, chloroprene rubber, chlorosulfonated polyethylene, polybutadiene rubber, natural rubber, EPM, EPDM, urethane rubber, and acrylic rubber. Among them, materials classified into ultra-high hardness synthetic rubber are desirably used as the elastic material.

3. Controller

The operation of the robot 2 is controlled by the controller 3. The controller 3 may be disposed outside the base 21 as shown in FIG. 1, or may be contained in the base 21. The controller 3 controls driving of the drive sections 261, 262, 263 and 264 according to an operation program stored in advance. Accordingly, the posture of the robot arm 20 is controlled.

4. Method of Assembling Robot

Next, an assembling method of the robot according to the embodiment will be described.

Figure 5:
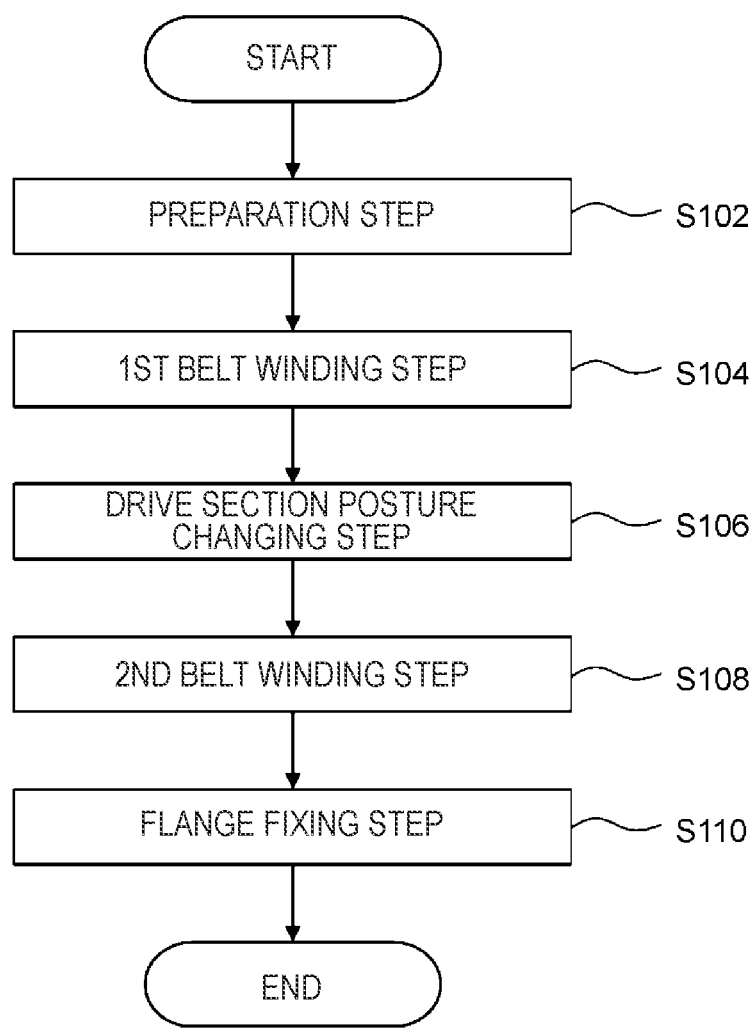
FIG. 5 is a process diagram for explaining the method of assembling a robot according to the embodiment.
Figure 9:
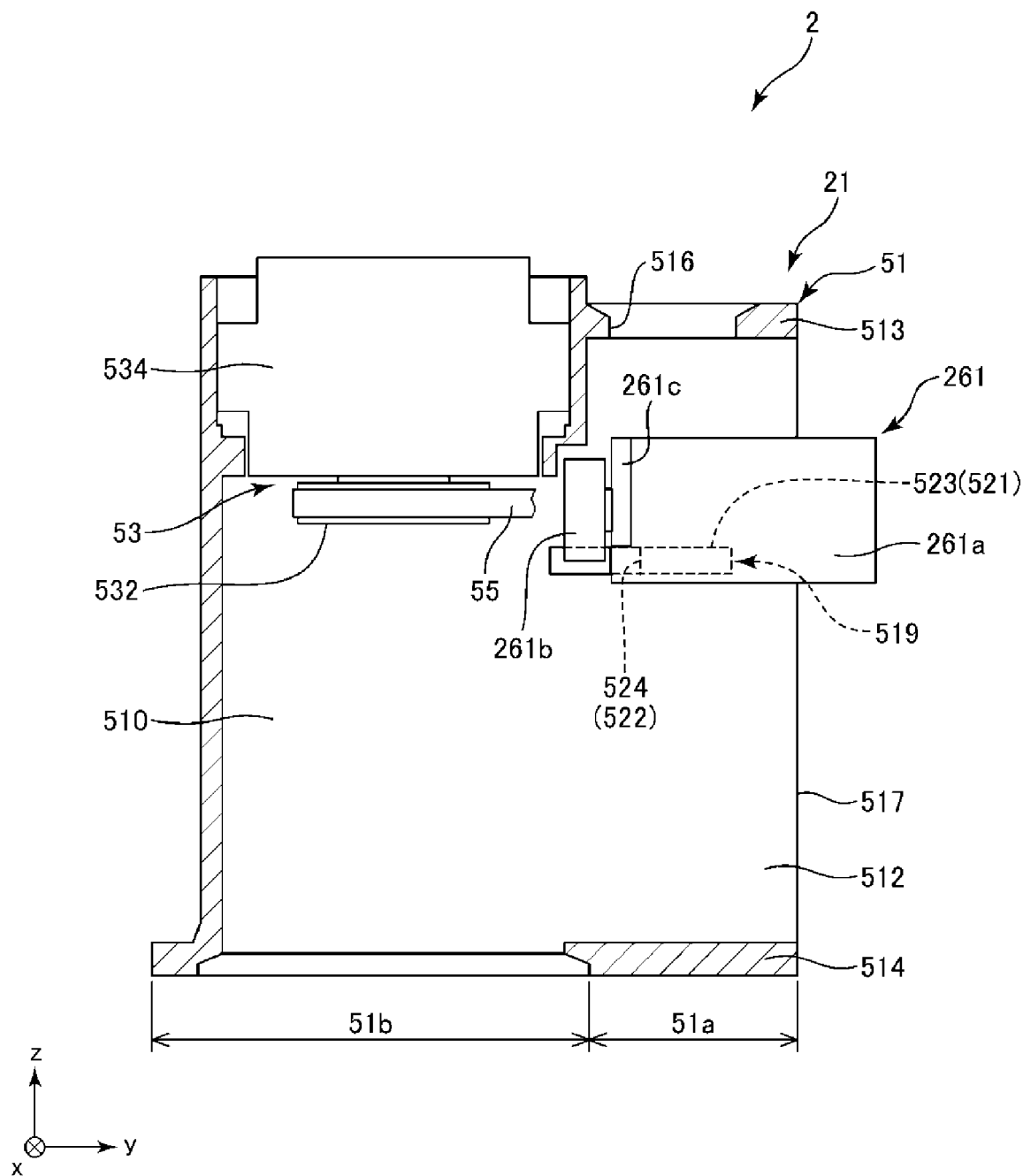
FIG. 9 is a sectional view for explaining the method of assembling the robot shown in FIG. 5.
Figure 10:
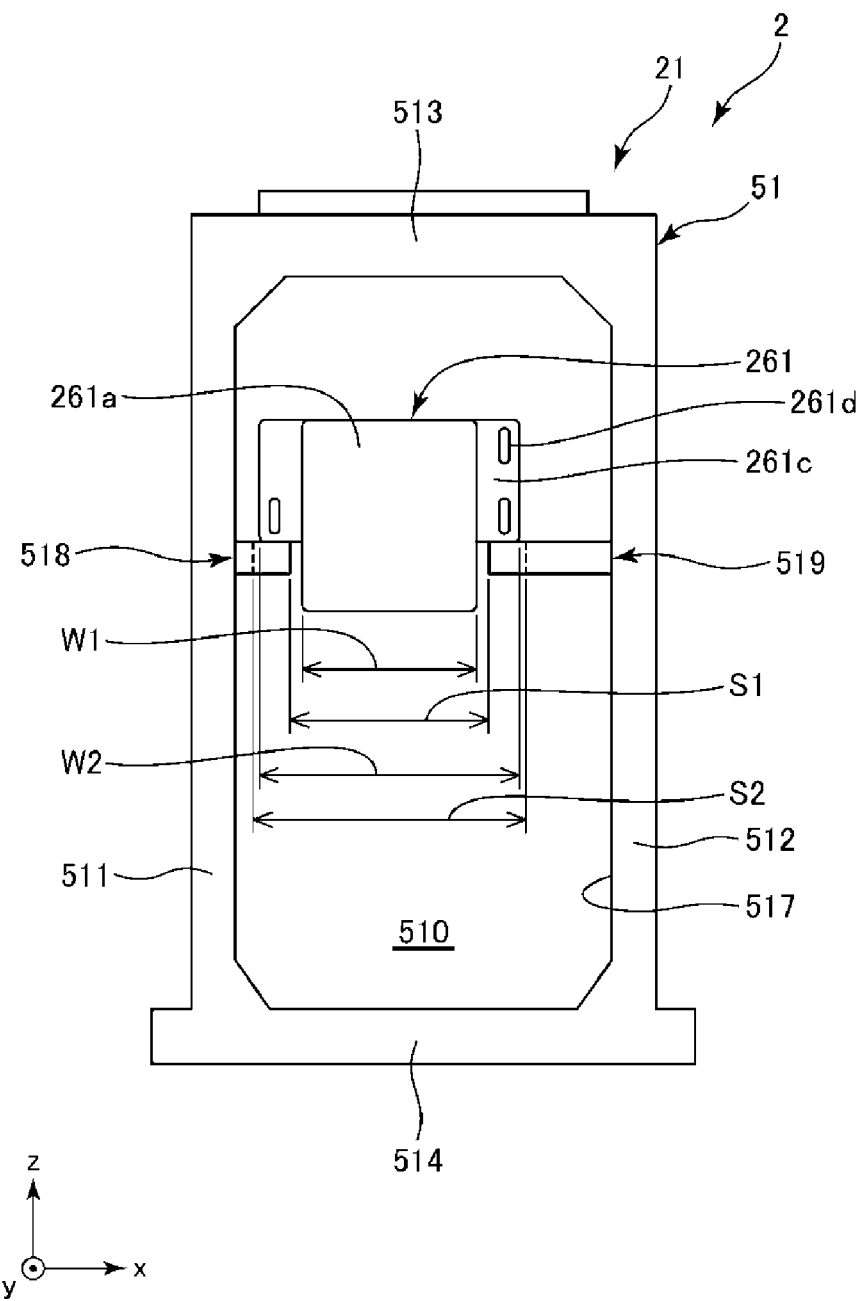
FIG. 10 is a side view for explaining the method of assembling the robot shown in FIG. 5.
Figure 11:
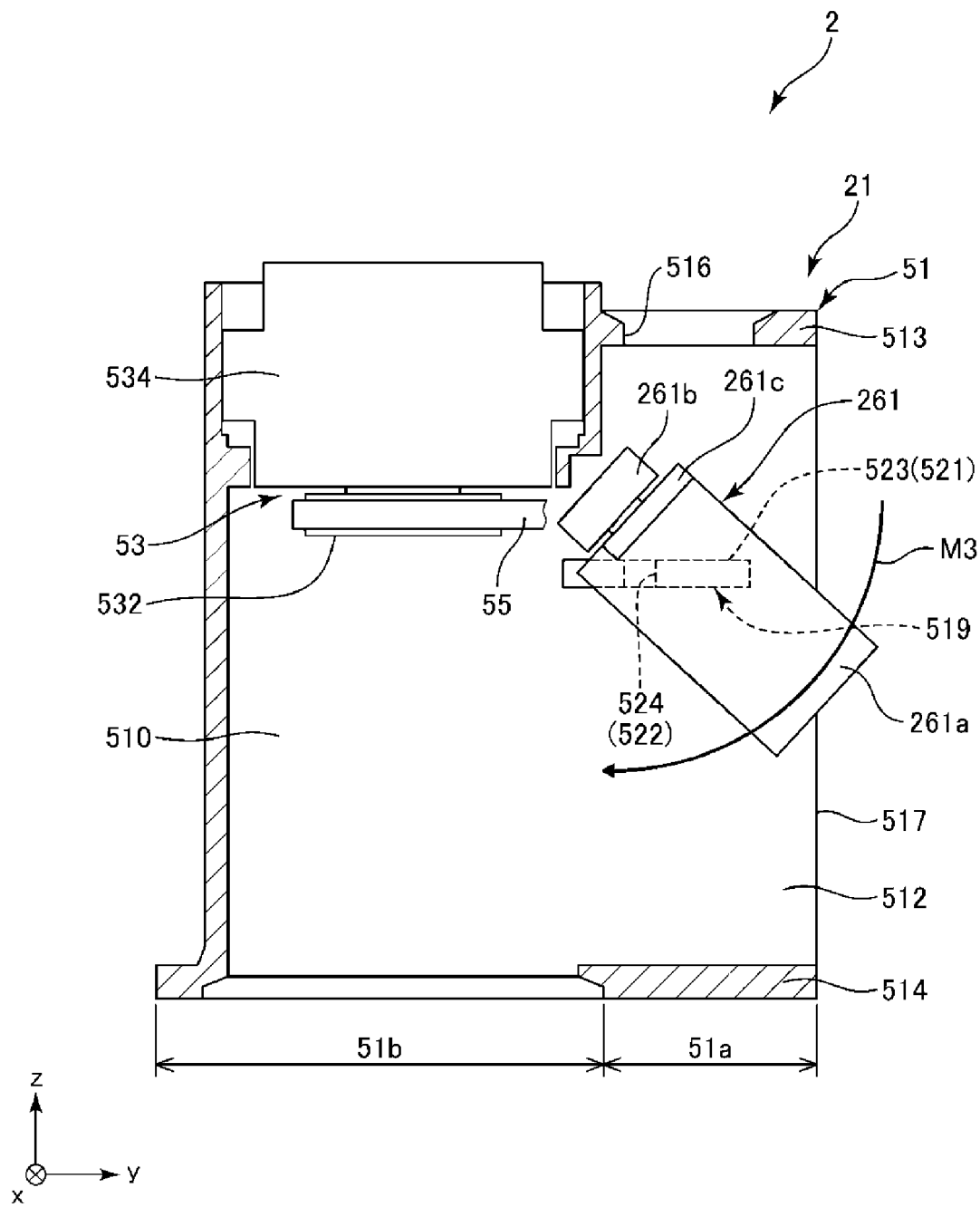
FIG. 11 is a sectional view for explaining the method of assembling the robot shown in FIG. 5.

FIG. 5 is a process diagram for explaining the method of assembling a robot according to the embodiment. FIGS. 6, 8, 9, 11, and 12 are sectional views for explaining the robot assembling method shown in FIG. 5. FIG. 7 is a top view for explaining the method of assembling the robot shown in FIG. 5. FIG. 10 is a side view for explaining the method of assembling the robot shown in FIG. 5. In FIGS. 9 and 11, a part of the belt 55 is omitted.

The method of assembling the robot shown in FIG. 5 includes a preparation step S102, a first belt winding step S104, a drive section posture changing step S106, a second belt winding step S108, and a flange fixing step S110. Hereinafter, each step will be described.

4.1. Preparation Step

Figure 6:
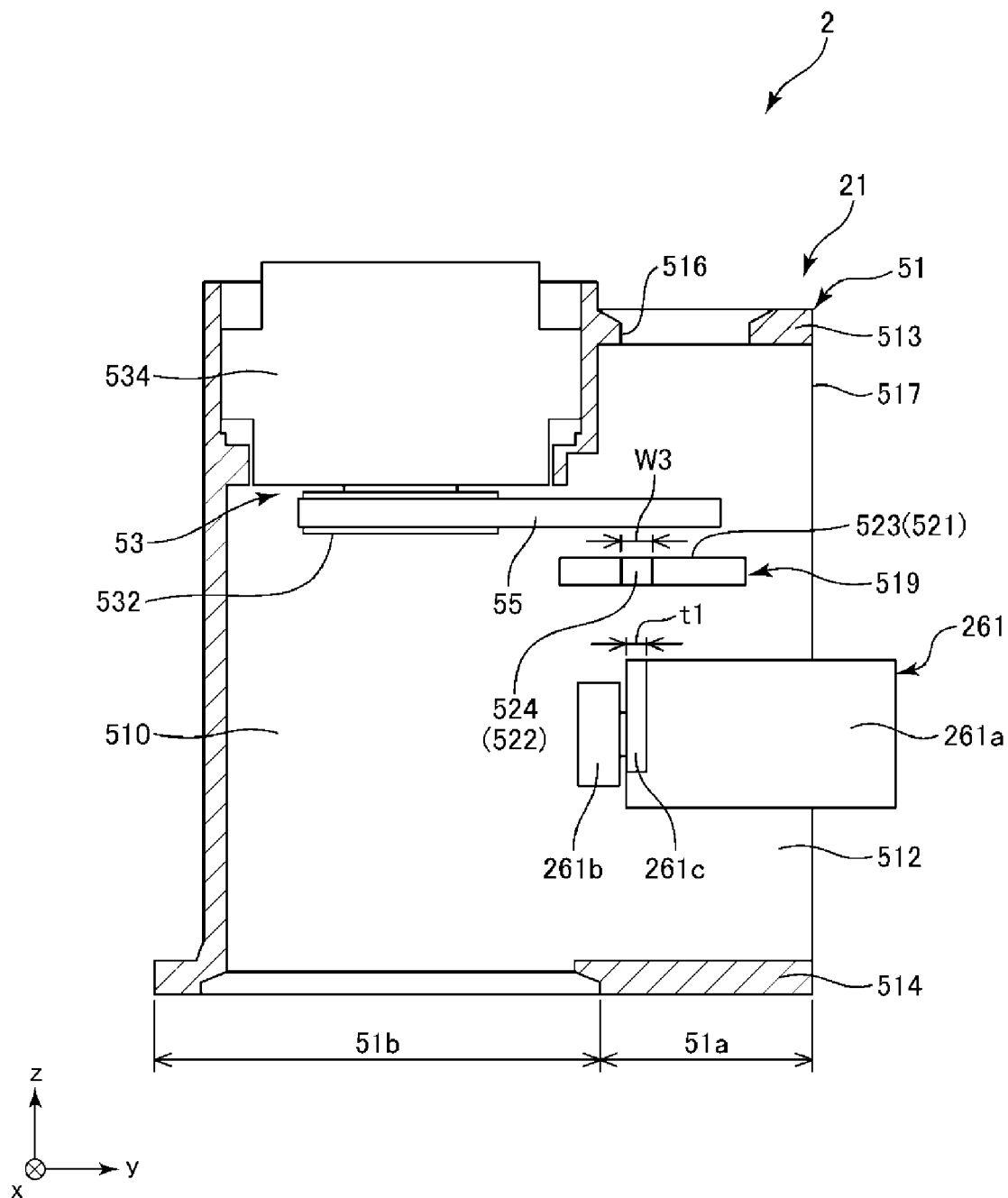
FIG. 6 is a sectional view for explaining the method of assembling the robot shown in FIG. 5.
Figure 7:
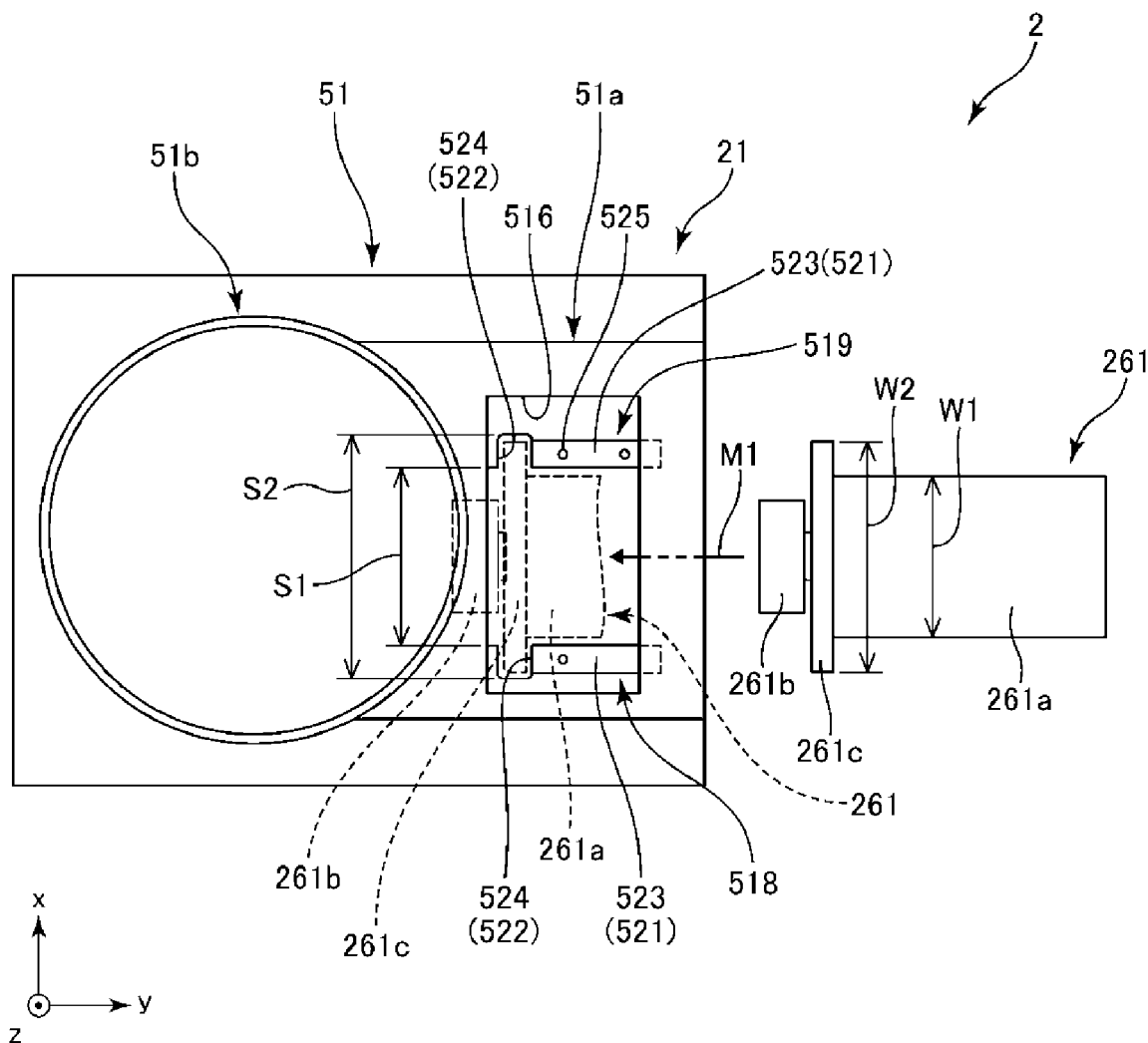
FIG. 7 is a top view for explaining the method of assembling the robot shown in FIG. 5.

In the preparation step S102, the base 21 (first member) before assembling shown in FIG. 6 is prepared. The base 21 before assembling shown in FIG. 6 includes the housing 51, the drive section 261, the joint section 53, and the belt 55, but the belt 55 is not yet wound to the drive section 261.

As shown in FIG. 3, the housing 51 includes the first wall 511, the second wall 512, the first protrusion 518, and the second protrusion 519. As shown in FIG. 2, the drive section 261 includes the motor body 261a, the drive pulley 261b, and the flange 261c. The joint section 53 includes the driven pulley 532 and the reduction gear 534. Each of the first protrusion 518 and the second protrusion 519 includes a support section 521 and a missing section 522.

The housing 51 is manufactured by, for example, a casting method, a die casting method, or the like. A part of the housing 51 may be formed by a machining method. Examples of the machining method include cutting and grinding. Examples of the portion formed by the machining method include the contact surfaces 523, the grooves 524, and the fastening holes 525. By forming these portions by a machining method, machining accuracy can be easily increased. For example, the coplanarity of the contact surface 523 of the first protrusion 518 and the contact surface 523 of the second protrusion 519, that is, the degree to which both are included in the same plane, can be increased. In addition, the positions of the grooves 524 and the fastening holes 525 in the x-y plane and the parallelism between the fastening holes 525 and the z-axis can be sufficiently close to the design values. As a result, it is possible to increase the accuracy of the position and the posture of the drive section 261 with respect to the housing 51.

Further, if the contact surfaces 523, the grooves 524, the fastening holes 525, and the like can be machined by a machining method, it is not necessary to manufacture these components by a casting method or a die casting method, and thus it is possible to reduce difficulty in manufacturing the housing 51.

The top plate 513 shown in FIG. 3 has the upper window 516 as described before. When viewed from a position along the drive axis AX4, that is, a position above the upper window 516, the upper window 516 overlaps with the missing sections 522. Therefore, a machining tool can be inserted from the upper window 516 to machine the contact surfaces 523, the grooves 524, the fastening holes 525 and the like. As a result, manufacture of the housing 51 becomes easy, and the robot 2 having an excellent manufacturing easiness can be realized.

Then, the joint section 53 is previously installed in the joint section containing portion 51b of the housing 51. In the joint section 53, as shown in FIG. 6, the driven pulley 532 is positioned below the reduction gear 534, and the driven pulley 532 is installed in a rotatable state. The reduction gear 534 is fixed to the housing 51.

4.2. First Belt Winding Step

In the first belt winding step S104, as shown in FIG. 6, one end of the belt 55 is wound around the driven pulley 532. As described above, the belt 55 has a mechanical strength capable of transmitting a high torque driving force. Therefore, the belt 55 itself has high rigidity, so when one end of the belt 55 is wound around the driven pulley 532, the other end of the belt 55 is in a state of extending toward the drive section containing portion 51a. Also, even if this is not the case, the other end of the belt 55 does not hang downward. Therefore, in the second belt winding step S108 described later, the drive pulley 261b can be inserted inside the other end of the belt 55. Accordingly, it is possible to relatively easily perform an operation of winding the belt 55 around drive pulley 261b.

4.3. Drive Section Posture Changing Step

In the drive section posture changing step S106, the drive section 261 is moved to the internal space 510 of the housing 51, and the posture of the drive section 261 is changed. This makes it easy to insert the drive pulley 261b into the inside of the other end of the belt 55.

Specifically, first, as shown by an arrow M1 in FIG. 7, the drive section 261 is moved from the external space toward the internal space 510. FIG. 7 is a schematic view showing a state in which the drive section 261 is moved from the external space of the housing 51 toward the internal space 510. The drive section 261 indicated by a solid line in FIG. 7 is the drive section 261 located at a position before the movement indicated by the arrow M1, and the drive section 261 indicated by a broken line in FIG. 7 is the drive section 261 located at a position after the movement indicated by the arrow M1.

In this step, as shown by the solid line in FIG. 7, when the housing 51 is viewed from the +z axis side to the −z axis side, the drive section 261 is held at a position where the missing sections 522 and the flange 261c overlap with each other. At this time, the position of the drive section 261 in the z axis direction is set below the second protrusion 519 as shown in FIG. 6. Further, as shown in FIG. 6 and FIG. 7, the posture of the drive section 261 is a posture in which the drive axis AX4 and the y axis are substantially parallel to each other and the flange 261c is substantially parallel to the x-z plane.

4.4. Second Belt Winding Step

Figure 8:
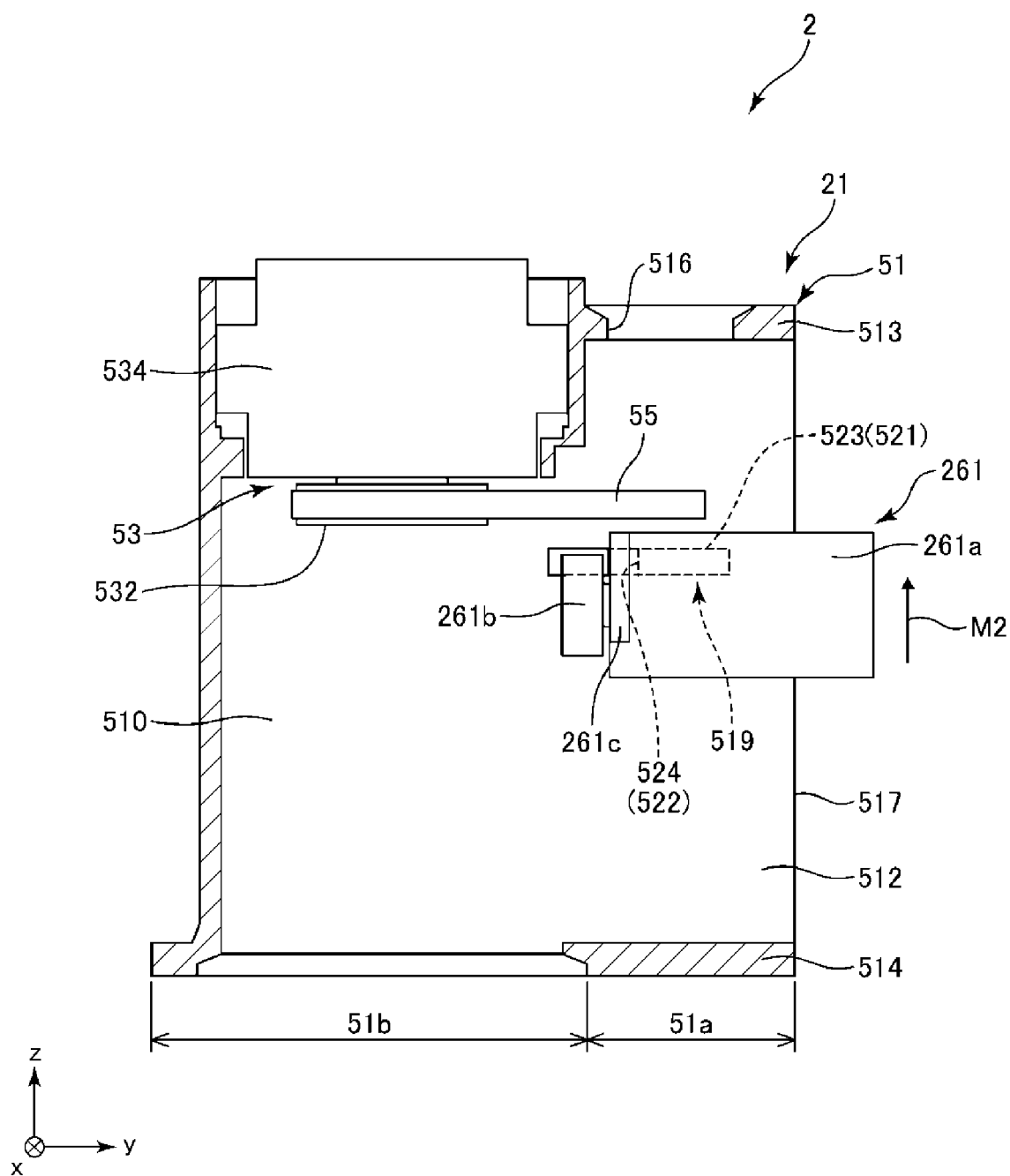
FIG. 8 is a sectional view for explaining the method of assembling the robot shown in FIG. 5.

In the second belt winding step S108, as indicated by an arrow M2 in FIG. 8, the drive section 261 is translated toward the +z axis side in a path in which both end portions of the flange 261c pass through the missing sections 522. FIG. 8 shows a state in which both end portions of the flange 261c are passing through the missing sections 522. By moving the drive section 261 upward from below the first protrusion 518 and the second protrusion 519 in this manner, it is possible to bring the drive pulley 261b closer from below to the other end of the belt 55. That is, assuming that the position in the z axis direction in which the first protrusion 518 and the second protrusion 519 are provided is a "reference position", then by providing the missing sections 522, the drive section 261 can be translated from a lower side (a region on the opposite side than the joint section 53) of the reference position to an upper side (a region in which the joint section 53 is positioned) of the reference position. By allowing such translation, even in a state in which one end of the belt 55 is wound around the driven pulley 532 in advance, the drive pulley 261b can be inserted from below inside the other end of the belt 55. Accordingly, finally, the belt 55 can be wound around the drive pulley 261b without strongly bending the belt 55.

In FIG. 7, a separation distance between the contact surface 523 of the first protrusion 518 and the contact surface 523 of the second protrusion 519, that is, a separation distance between the support sections 521, is defined as S1, and a separation distance between the groove 524 of the first protrusion 518 and the groove 524 of the second protrusion 519, that is, a separation distance between the missing sections 522, is defined as S2. These separation distances S1 and S2 refers to distances in the x axis direction. In FIG. 7, the width of the motor body 261a is defined as W1, and the width of the flange 261c is defined as W2. These widths W1 and W2 refer to the length in the x axis direction.

These separation distances S1 and S2 and the widths W1 and W2 satisfy the following formula (1).

$$W1 < S1 < W2 < S2 \tag{1}$$

In the above formula (1), since W1<S1 is established, when the drive section 261 is translated as indicated by an arrow M2 in FIG. 8, the motor body 261a can pass between the support sections 521.

Further, in the above formula (1), W2<S2 is established. Further, as shown in FIG. 6, the width W3 of the grooves 524 in the y axis direction is wider than the thickness t1 of the flange 261c. Therefore, when the drive section 261 is translated as indicated by an arrow M2 in FIG. 8, both ends of the flange 261c can pass through the missing sections 522.

Next, when the flange 261c has passed through the missing sections 522, the translation is stopped and the drive section 261 is held. FIG. 9 shows a state in which the flange 261c has passed through the missing sections 522, that is, a state in which the movement of the drive section 261 indicated by the arrow M2 in FIG. 8 has been ended. In FIG. 9, the drive pulley 261b is in a state in which it is inserted inside the other end of the belt 55 from below. At this point, the drive pulley 261b does not necessarily have to be inserted into the other end of the belt 55, and it is sufficient that the other end of the belt 55 and the drive pulley 261b are close to each other.

FIG. 10 is a view showing a state in which the flange 261c has passed through the missing sections 522 as viewed from a viewpoint different from that of FIG. 9. As shown in FIG. 10, at this time, the flange 261c is located above the first protrusion 518 and the second protrusion 519. In this embodiment, even if the flange 261c is positioned above the first protrusion 518 and the second protrusion 519, part of the motor body 261a is positioned between the first protrusion 518 and the second protrusion 519. Note that the form of the drive section 261 is not limited to the illustrated form.

Next, as shown in FIG. 11, the drive section 261 is rotated about an axis parallel to the x axis as a central axis. To be specific, the drive section 261 is rotated as indicated by an arrow M3 in FIG. 11 with a ridge line located at a lower end of the flange 261c shown in FIG. 11 as the rotation axis. Accordingly, the drive pulley 261b moves upward and the motor body 261a moves downward. As a result, the posture of the drive pulley 261b inserted inside the belt 55 changes, and accordingly, the other end of the belt 55 is wound around the drive pulley 261b. Further, both end portions of the flange 261c come into contact with the contact surfaces 523. This completes the operation of winding the belt 55 around the drive pulley 261b and the operation of positioning the drive section 261 in the z axis direction.

Since S1<W2 is established in the above formula (1), the flange 261c can be placed on the contact surfaces 523 when the drive section 261 is rotated as indicated by the arrow M3 in FIG. 11. Accordingly, the flange 261c can be supported by the support sections 521.

By adopting the procedure in which the belt 55 is wound around the drive pulley 261b while changing the posture of the drive section 261 as described above, when the belt 55 is wound around the drive pulley 261b, it is not necessary to strongly bend the belt 55. In addition, in the robot 2, the motor body 261a is located on the side opposite to the reduction gear 534 with respect to belt 55 in the direction along the drive axis AX4. That is, the reduction gear 534 is located above the belt 55, and the motor body 261a is located below the belt 55. Therefore, the belt 55 can be wound around the drive pulley 261b simply by inserting the drive pulley 261b from below to inside the other end of the belt 55, and the belt 55 and the motor body 261a are less likely to interfere with each other in the process of the work. Therefore, from that point of view, it is not necessary to strongly bend the belt 55. For these reasons, damage to the belt 55 can be avoided.

On the other hand, in the related art, even if an attempt is made to fix the servo motor to the housing while changing the posture of the servo motor so as to insert the pulley into the inside of the timing belt, when the posture of the servo motor is changed, the flange and the protruding portion protruding from the inner wall of the housing interfere with each other. Therefore, the posture of the servo motor cannot be changed, and the pulley cannot be inserted into the inside of the timing belt.

In contrast to such a related art, according to the above described structure and procedure, it is possible, while suppressing the load applied to the belt 55, to wind the belt 55 around the drive pulley 261b connected to the motor body 261a, and to perform positioning of the drive section 261 using engagement between the flange 261c of the drive section 261 and the housing 51 of the base 21.

Further, it is not necessary to secure a space for bending the belt 55. To be specific, in a case where the belt 55 is wound around the drive pulley 261b supported by the housing 51 in advance, it is necessary to wind the belt 55 around the drive pulley 261b while bending the belt 55, and thus a space for largely bending the belt 55 is necessary. For example, when the belt 55 is largely bent upward, it is necessary to extend the distance between the reduction gear 534 and the driven pulley 532 in the z axis direction in order to avoid interference between the reduction gear 534 and the belt 55. However, if this distance is extended, a load is likely to be applied to the reduction gear 534, which causes the life of the reduction gear 534 to be shortened.

In the present embodiment, since it is not necessary to largely bend the belt 55, it is possible to reduce the distance between the reduction gear 534 and the belt 55 in the z axis direction. As a result, the load applied to the reduction gear 534 can be reduced, and the life of the reduction gear 534 can be extended.

In addition, a part of the motor body 261a is arranged so as to overlap with the joint section containing portion 51b. Accordingly, the housing 51 can be downsized.

4.5. Flange Fixing Step

Figure 12:
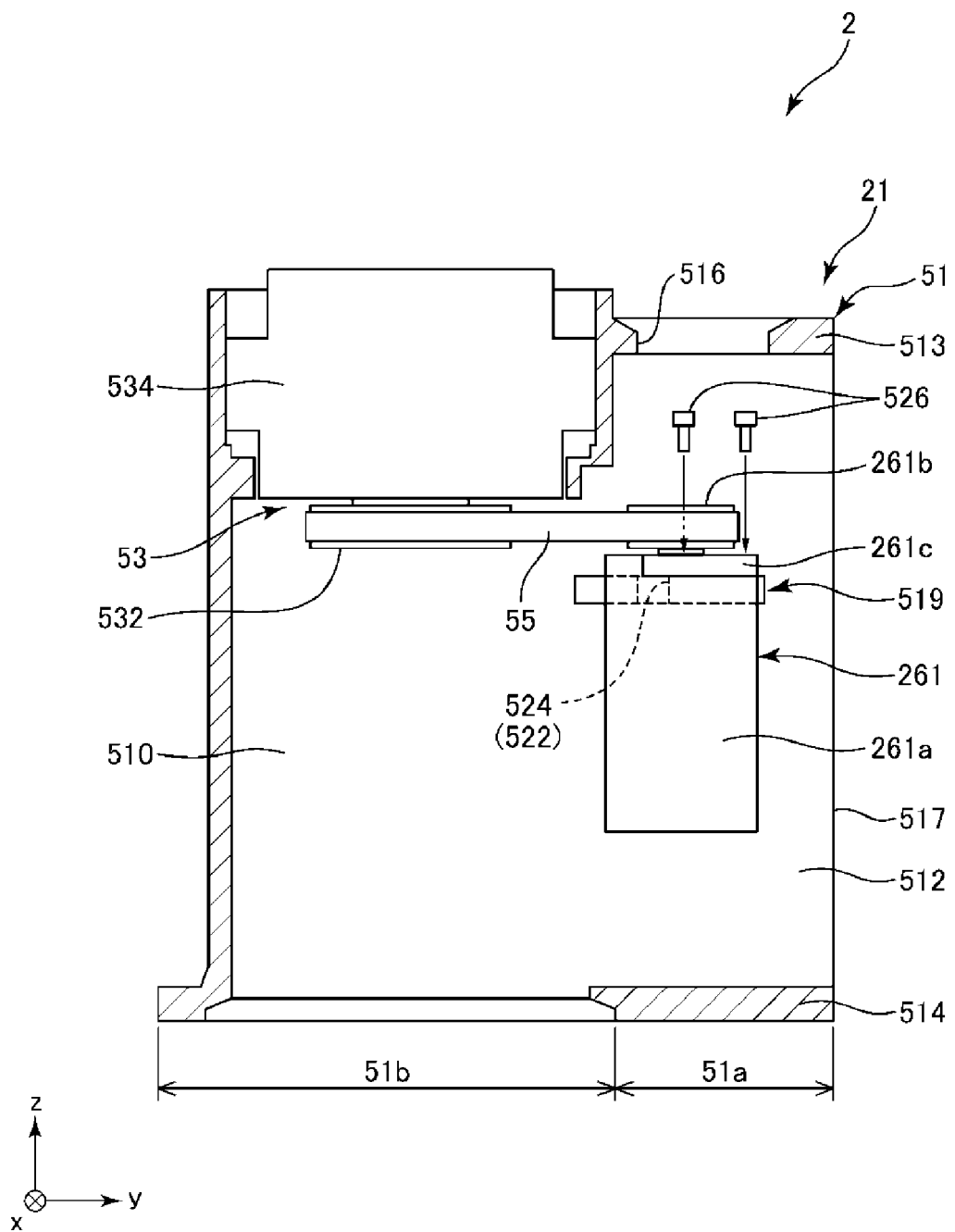
FIG. 12 is a sectional view for explaining the method of assembling the robot shown in FIG. 5.

In the flange fixing step S110, as shown in FIG. 12, the flange 261c is fixed to the support sections 521 using screws 526. To be specific, the screws 526 shown in FIG. 12 are inserted into the fixing holes 261d of the flange 261c shown in FIG. 3, and the screws 526 are screwed into the fastening holes 525 shown in FIG. 4. Note that the method of fixing the flange 261c to the support section 521 is not limited to the method using the screws 526, and other methods may be used.

Further, the screws 526 and a tool for screwing the screws 526 into the fastening hole 525 can be introduced through the upper window 516 toward the internal space 510. Therefore, by providing the upper window 516, the efficiency of the assembly work of the robot 2 can be enhanced.

Further, as described above, the drive section containing portion 51a shown in FIG. 3 has the side window 515 and the full wall window 517. The work of changing the position and the posture of the drive section 261 can be performed by a worker or a working robot by introducing a hand or an arm through at least one of the side window 515 or the full wall window 517. Therefore, by providing the side window 515 and the full wall window 517, the efficiency of the assembly work of the robot 2 can be enhanced.

The base 21 is assembled as described above. Thereafter, the robot arm 20 is connected to the base 21, so that the robot 2 is assembled.

When the base 21 shown in FIG. 2 is viewed from a position along the drive axis AX4, the missing sections 522 are located between the drive axis AX4 and the joint section53. That is, the positions of the missing sections 522 in the y axis direction is between the drive axis AX4 and the joint section 53 shown in FIG. 2. By providing the missing sections 522 at such positions, when the posture of the drive section 261 is changed from the posture shown in FIG. 8 to the posture shown in FIG. 12, the posture change of the drive section 261 becomes smooth. That is, after the drive section 261 is translated as indicated by the arrow M2 in FIG. 8, the operation of inserting the drive pulley 261b from below inside the other end of the belt 55 can be easily performed as shown in FIG. 9.

Further, the upper window 516, the side window 515, and the full wall window 517 can also be used as work routes when repair or maintenance is performed after assembling the robot 2. With these work routes, it is possible to repair the base 21 in the installed posture without turning the base 21 upside down after assembly. Further, it is not necessary to remove the robot arm 20 from the base 21 for repair or the like. For this reason, the efficiency of the repair or the like can be enhanced.

5. Effects Achieved by Embodiment

As described above, the method of assembling the robot according to the embodiment is a method of assembling the robot 2, which has the base 21 (first member) and the first arm 22 (second member) that rotates relative to the base 21, and the method includes the preparation step S102, the first belt winding step S104, the drive section posture changing step S106, the second belt winding step S108, and the flange fixing step S110.

In the preparation step S102, the base 21 before assembly, which includes the housing 51, the drive section 261, the joint section 53, and the belt 55, is prepared.

The housing 51 includes the first wall 511, the second wall 512, the first protrusion 518, and the second protrusion 519. The first wall 511 and the second wall 512 are disposed to face each other separated by a distance from each other (with the internal space 510 in between). The first protrusion 518 protrudes from the first wall 511 toward the second wall 512. The second protrusion 519 protrudes from the second wall 512 toward the first wall 511.

The drive section 261 includes the motor body 261a, the drive pulley 261b, and the flange 261c. The motor body 261a generates a driving force to rotate about a drive axis AX4. The drive pulley 261b is connected to the motor body 261a. The flange 261c protrudes from the motor body 261a in a direction intersecting with the drive axis AX4. The joint section 53 includes the driven pulley 532 and transmits the driving force to the first arm 22.

The first protrusion 518 and the second protrusion 519 each include a support section 521 and a missing section 522. With respect to the support sections 521, the mutual separation distance S1 is shorter than the length (width W2) in the direction in which the flange 261c protrudes. With respect to the missing sections 522, the mutual separation distance S2 is longer than the length (width W2) in the direction in which the flange 261c protrudes.

In the first belt winding step S104, the belt 55 is wound around the driven pulley 532. In the drive section posture changing step S106, the drive section 261 is brought close to the belt 55 by a path in which both end portions of the flange 261c in a direction in which the flange 261c protrudes pass through the missing sections 522.

In the second belt winding step S108, the belt 55 is wound around the drive pulley 261b. In the flange fixing step S110, the flange 261c is fixed to the support section 521.

According to such an assembling method, the belt 55 can be wound around the drive pulley 261b while suppressing the load applied to the belt 55. In addition, it is possible to perform positioning of the driving section 261 using engagement between the flange 261c of the drive section 261 and the housing 51 of the base 21. Therefore, according to the assembling method described above, it is possible to assemble the robot 2 with high reliability while suppressing damage to the belt 55.

In addition, the robot 2 according to the embodiment includes the base 21 (first member) and the first arm 22 (second member) that rotates relative to the base 21.

The base 21 includes the housing 51, the drive section 261, the joint section 53, and the belt 55. The housing 51 includes the first wall 511, the second wall 512, the first protrusion 518, and the second protrusion 519. The first wall 511 and the second wall 512 are disposed to face each other separated by a distance from each other (with the internal space 510 in between). The first protrusion 518 protrudes from the first wall 511 toward the second wall 512. The second protrusion 519 protrudes from the second wall 512 toward the first wall 511.

The drive section 261 includes the motor body 261a, the drive pulley 261b, and the flange 261c. The motor body 261a generates a driving force to rotate about a drive axis AX4. The drive pulley 261b is connected to the motor body 261a. The flange 261c protrudes from the motor body 261a in a direction intersecting with the drive axis AX4.

The joint section 53 includes the driven pulley 532 and transmits the driving force to the first arm 22. The belt 55 is wound around the drive pulley 261b and the driven pulley 532.

Each of the first protrusion 518 and the second protrusion 519 includes the support section 521 and the missing section 522. With respect to the support sections 521, the mutual separation distance S1 is shorter than the length (width W2) in the projecting direction of the flange 261c, and both end portions in the projecting direction of the flange 261c are supported. With respect to the missing sections 522, the mutual separation distance S2 is longer than the length (width W2) in the direction in which the flange 261c protrudes, and both ends of the flange 261c can pass through.

According to such a configuration, it is possible to obtain the robot 2 in which the belt 55 can be wound around the drive pulley 261b while suppressing the load applied to the belt 55. In such a robot 2, since damage to the belt 55 is suppressed, reliability is improved. In addition, by engaging the flange 261c of the drive section 261 with the housing 51 of the base 21, the drive section 261 can be positioned with respect to the housing 51.

In the robot 2 according to the embodiment, when viewed from a position along the drive axis AX4, the missing sections 522 are located between the drive axis AX4 and the joint section 53.

By providing the missing sections 522 at such a position, when the posture of the drive section 261 changes from the posture shown in FIG. 8 to the posture shown in FIG. 12, the posture change of the drive section 261 becomes smooth. This makes it possible to realize the robot 2 that is easy to assemble.

In addition, in the robot 2 according to the embodiment, the housing 51 at least includes the internal space 510, which is defined by the first wall 511 and the second wall 512, and the upper window 516, which is an opening that connects the internal space 510 and the external space. When viewed from a position along the drive axis AX4, that is, a position above the upper window 516, the upper window 516 and the missing section 522 overlap each other.

Thus, for example, when the missing sections 522 are formed in the first protrusion 518 and the second protrusion 519 using a processing tool, the processing tool can be introduced into the internal space 510 through the upper window 516. Therefore, the grooves 524 can be machined without changing the posture of the housing 51 shown in FIG. 12.

Further, in the robot 2 according to the present embodiment, the support sections 521 have the fastening holes 525. The flange 261c is fastened to the support sections 521 using the fastening holes 525.

According to such a configuration, the flange 261c can be securely fixed to the support sections 521, and the fixed condition can be easily released if necessary. For this reason, it is possible to improve maintainability while improving assembly efficiency of the robot 2.

In addition, in the robot 2 according to the embodiment, when viewed from a position along the drive axis AX4, the upper window 516, which is the opening, and the fastening holes 525 overlap each other. That is, the fastening holes 525 are provided so as to be visible from the upper window 516 when the robot 2 is viewed from above.

According to such a configuration, an operation of machining the fastening holes 525 and an operation of screwing the screws 526 into the fastening holes 525 can be efficiently performed through the upper window 516.

In addition, in the robot 2 according to the present embodiment, the support sections 521 include the contact surfaces 523 which contact the flange 261c. This contact surfaces 523 are preferably machined surfaces. This makes it possible to increase the coplanarity of the two contact surfaces 523. As a result, it is possible to increase the accuracy of the position and the posture of the drive section 261 with respect to the housing 51. The contact surfaces 523 may not be provided on the support sections 521.

Further, in the robot 2 according to the present embodiment, the joint section 53 has the reduction gear 534 connected to the driven pulley 532. The motor body 261a is located on the opposite side than the reduction gear 534 with respect to the belt 55 in the direction along the drive axis AX4.

Thus, the belt 55 can be wound around the drive pulley 261b without strongly bending the belt 55 and without securing a space for bending the belt 55. As a result, damage to the belt 55 can be avoided, and the distance between the reduction gear 534 and the belt 55 can be shortened. As a result, it is possible to extend the lives of the belt 55 and the reduction gear 534.

In addition, the robot system 1 according to the present embodiment includes the robot 2 and the controller 3 that controls the operation of the robot 2.

The robot 2, as described above, has high reliability and long life of the belt 55 and the reduction gear 534. Therefore, it is possible to realize the robot system 1 having high reliability and a long life.

The robot, the method of assembling the robot, and the robot system according to the present disclosure have been described above based on the embodiments shown in drawings, but the robot and the robot system according to the present disclosure are not limited to the embodiments. For example, each component of the embodiments may be replaced with an arbitrary configuration having the same function, an arbitrary configuration may be added to the embodiments, or a plurality of the embodiments may be combined. In addition, the method of assembling a robot according to the present disclosure may be a method in which a process for an arbitrary purpose is added to the above described embodiment.

What is claimed is:

1. A robot comprising:
a first member and
a second member that rotates relative to the first member, wherein
the first member includes
a housing including a first wall and a second wall disposed to face each other separated by a distance, a first protrusion protruding from the first wall toward the second wall, and a second protrusion protruding from the second wall toward the first wall,
a drive section including a motor body that generates a drive force rotating about a drive axis, a drive pulley that is connected to the motor body, and a flange that protrudes from the motor body in a direction intersecting the drive axis,
a joint section that has a driven pulley and that transmits the driving force to the second member, and
a belt wound around the drive pulley and the driven pulley, and
the first protrusion and the second protrusion include
support sections that support both end portions of the flange in the direction in which the flange protrudes, a separation distance between the support sections being shorter than a length of the flange in the direction in which the flange protrudes and
missing sections configured such that a separation distance between the missing sections is longer than the length of the flange in the direction in which the flange protrudes, both end portions of the flange passing through the missing sections.

2. The robot according to claim 1, wherein,
the missing sections are located between the drive axis and the joint section as viewed from a position along the drive axis.

3. The robot according to claim 1, wherein
the housing has an opening that connects an internal space and an external space, the internal space being defined by at least the first wall and the second wall and
the opening and the missing sections overlap each other as viewed from a position along the drive axis.

4. The robot according to claim 1, wherein
the support sections have fastening holes and the flange is fastened to the support section using the fastening holes.

5. The robot according to claim 4, wherein
the housing has an opening that connects an internal space and an external space, the internal space being defined by at least the first wall and the second wall and
the opening and the fastening holes overlap each other as viewed from a position along the drive axis.

6. The robot according to claim 1, wherein
the support sections have contact surfaces that contact the flange and
the contact surfaces are machined surfaces.

7. The robot according to claim 1, wherein
the joint section includes a reduction gear connected to the driven pulley and
the motor body is located on an opposite side of the reduction gear with respect to the belt in a direction along the drive axis.

8. A method of assembling a robot comprising:
a first member and
a second member that rotates relative to the first member,
the method comprising:
a step of preparing the first member before assembly, the first member before assembly including a housing including a first wall and a second wall disposed to face each other separated by a distance, a first protrusion protruding from the first wall toward the second wall, and a second protrusion protruding from the second wall toward the first wall, a drive section including a motor body that generates a drive force rotating about a drive axis, a drive pulley that is connected to the motor body, and a flange that protrudes from the motor body in a direction intersecting the drive axis, a joint section that has a driven pulley and that transmits the driving force to the second member, and a belt, the first protrusion and the second protrusion include support sections in which a separation distance between the support sections is shorter than a length of the flange to which the flange protrudes and missing sections in which a separation distance between the missing sections is longer than the length of the flange in which the flange protrudes;
a step of winding the belt around the driven pulley;
a step of bringing the drive section close to the belt through a path in which both ends of the flange in a direction in which the flange protrudes pass through the missing sections;
a step of winding the belt around the drive pulley; and
a step of fixing the flange to the support section.

9. A robot system comprising:
the robot according to claim 1, and
a controller that controls an operation of the robot.

* * * * *